Figure 5:
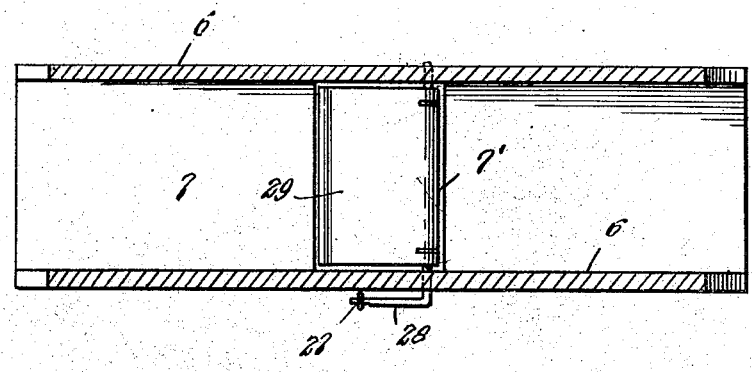

July 15, 1924.
V. C. GARRISON
1,501,213
ANIMAL TRAP
Original Filed Feb. 10, 1923   3 Sheets-Sheet 1
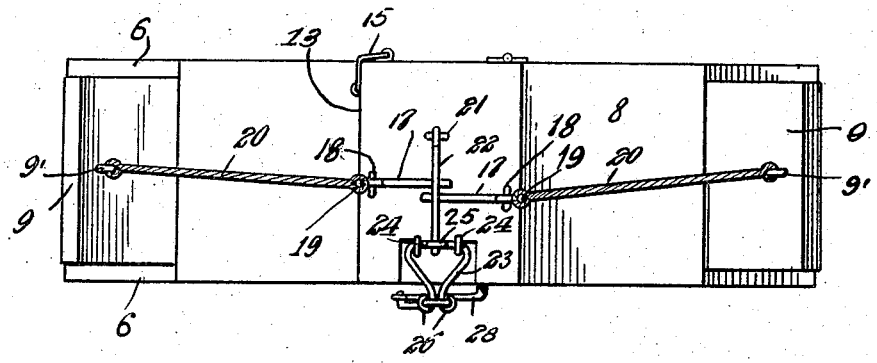
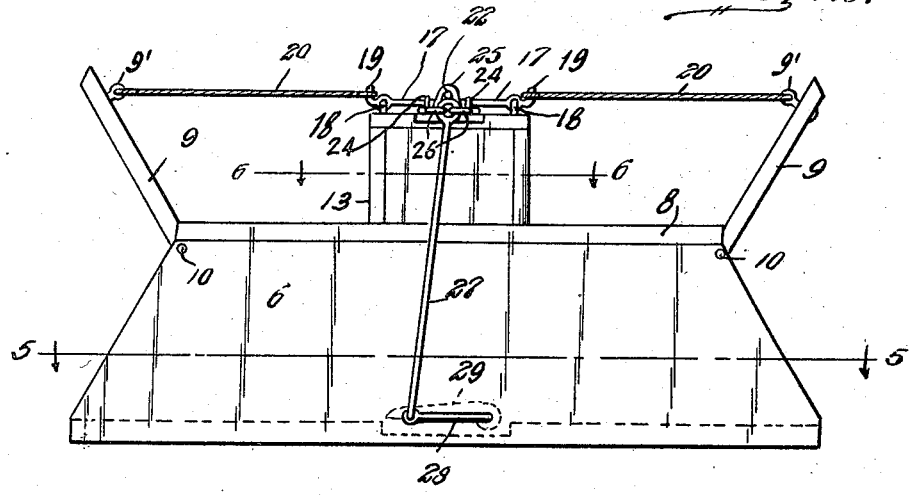

July 15, 1924.
V. C. GARRISON
1,501,213
ANIMAL TRAP
Original Filed Feb. 10, 1923   3 Sheets-Sheet 2
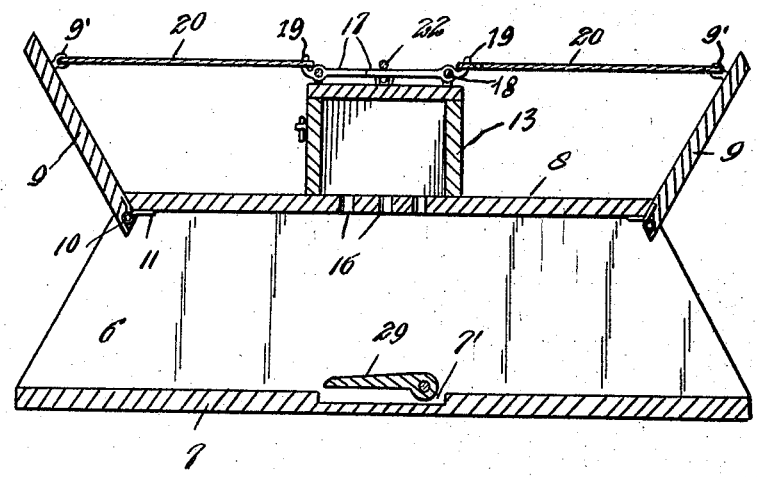
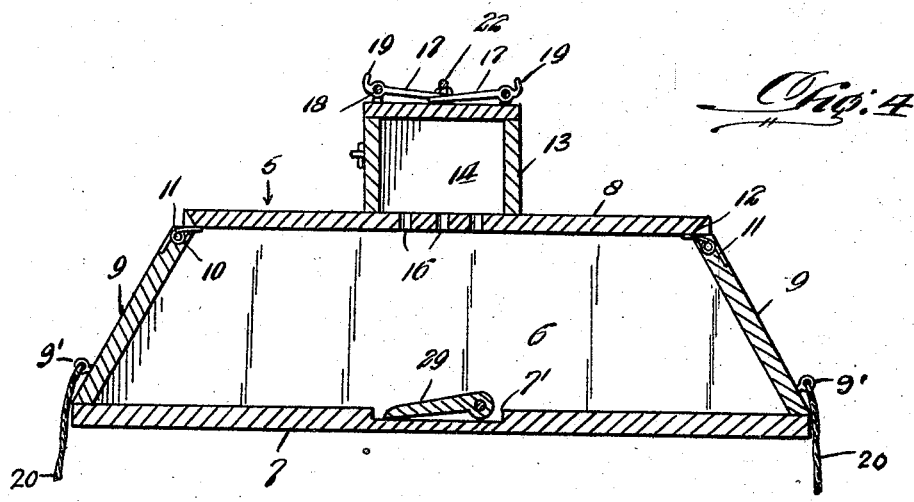

July 15, 1924.  
V. C. GARRISON  
ANIMAL TRAP  
Original Filed Feb. 10, 1923    3 Sheets-Sheet 3

1,501,213

Vance C. Garrison
Inventor

Witnesses:
F. L. Fox.
E. L. Stonelle

Clarence C. O'Brien
Attorney

Patented July 15, 1924.

1,501,213

UNITED STATES PATENT OFFICE.

VANCE C. GARRISON, OF NEBISH, MINNESOTA, ASSIGNOR TO RAYMOND H. SCHU-MAKER, OF BEMIDJI, MINNESOTA.

ANIMAL TRAP.

Application filed February 10, 1923, Serial No. 618,231. Renewed May 13, 1924.

*To all whom it may concern:*

Be it known that I, VANCE C. GARRISON, a citizen of the United States, residing at Nebish, in the county of Beltrami and State of Minnesota, have invented certain new and useful Improvements in Animal Traps, of which the following is a specification.

My invention relates to improvements in traps, and has for the primary object thereof, to substantially improve upon animal traps with which I am now familiar, the device being characterized by its simplicity of construction, and relative inexpensiveness of manufacture, the same embodying substantially few parts, and these so co-related as to reduce the liability of derangement to a minimum.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1—is a top plan view of a trap constructed in accordance with my invention, the same being shown as set.

Figure 2—is a side elevational view thereof.

Figure 3—is a vertical cross sectional view of the trap shown in Figures 1 and 2, the trap doors thereof being shown as open.

Figure 4—is a view similar to Figure 3 with the trap doors closed.

Figure 5—is a longitudinal transverse sectional view upon the line 5—5 of Figure 2.

Figure 6:
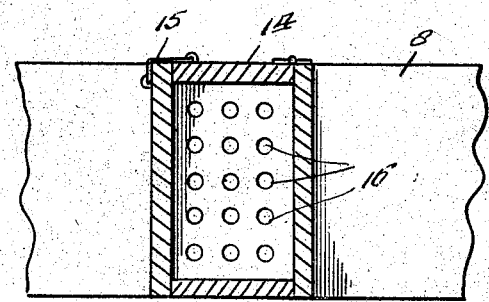
Figure 7:
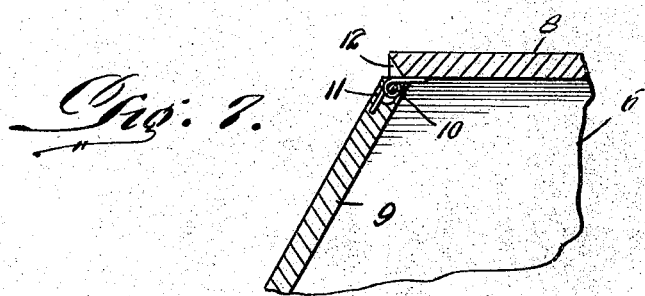

Figure 6—is a view similar to Figure 5 but taken upon the line 6—6 of the same, and Figure 7—is an enlarged fragmentary cross sectional view of a portion of the trap, disclosing the specific manner in which each of the trap doors are hinged to the trap body.

Referring to the drawings in detail, there is shown a main body portion 5 in the form of a relatively elongated casing, and side walls 6, a bottom wall 7, and a top wall 8. The opposite ends of this casing are open, which openings are at an inclination with respect to the longitudinal axis of said body 5. Trap doors 9 are hingedly secured to the opposite ends of said body through the instrumentality of cross pins 10 engaging through the upper ends thereof, the opposite ends of these pins extending through openings in the side walls 6 of said casing and directly beneath the ends of the top wall 8. These trap doors 9 are maintained in their normally closed position through the instrumentality of spring members 11 which encircle the said rods 10. The opposite ends of the top fall 8 of the body 5 are bevelled as at 12 for permitting the upward swinging movement of said trap doors.

Upon the top walls of the body 5 and substantially centrally thereof is a rectangular-shaped receptacle 13 formed with a hinged door 14, means as at 15 being provided for locking the door in its closed position. The central portion of the top 8 of the body 5 constitutes the bottom of said receptacle 13, and is formed with a plurality of openings 16. Upon the top wall of the receptacle 13 are levers 17, the same being pivotally secured as at 18 to the said receptacle adjacent its front and rear edges. The outer ends of the members 17 are hooked as at 19, the inner ends thereof being of such a length as to extend slightly more than half-way across the top of the receptacle and being slightly out of alinement with each other.

Each of the trap doors 9 carry an eye member 9' to which is connected one end of a cord 20, the opposite ends of these cords being eyed and adapted for engagement with the said hooked ends 19 of the levers 17 when the doors are in a raised position as shown in Figure 3.

As a means for maintaining the eyed ends of each of these cords 20 in position over the hooked ends 19 of said levers 17, there is loosely, pivotally secured as at 21 upon the top wall of said receptacle a rod 22, which rod is adapted to engage over the inner ends of each of the said levers. Slightly inwardly of the front end of the rod 22 is a retaining member 23, the same being formed of a single length of wire and being inserted through a pair of relatively small eye members 24, one upon each side of said rod 22. A portion of the wire constituting this member 23 between the said eye members 24 is bent upwardly as at 25 for engaging over the outer end of said rod 22.

The ends of the wire constituting the member 23 project outwardly of the receptacle 13 and are eyed as at 26 for receiving the eyed end of a rod 27. This rod 27 extends downwardly along one side of the body 5 of the trap and is connected at its lower end to an arm 28, which arm is operatively connected with an animal controlled platform 29 within a central depression 7' of the bottom wall 7 of said body 5.

In view of the above description, it will at once be apparent that the receptacle 13 is adapted for the reception of bait, and when the trap is set as shown in Figures 1, 2 and 3, an animal entering the body of the trap being attracted by the odor of the bait passing through the openings 16 in the top wall 8 of the body will engage upon the platform 29 which will consequently draw downwardly on the rod 27 and swing the latch member 23 away from the rod 22 permitting the cords 20 to disengage from the hooked ends of the levers 17, and in view of the springs 11, together with the weight of these doors, the same will drop, thereby trapping an animal within the body 5.

Although I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters Patent is:

In an animal trap, an open ended body having openings in its top, a bait receptacle on top of said body above said openings, spring-closed swinging trap doors for the open ends of said body, pivoted members on top of the bait receptacle having hooked outer ends, flexible members attached to the free ends of the trap doors and adapted for engagement with said hooked outer ends of the pivoted members for holding the trap doors open, said pivoted members being normally swung under the influence of the doors in one direction to disengage said flexible members from said hooked ends, a pivoted platform within said body, and means operatively connected to the platform for releasably holding the pivoted members in an oppositely swung position wherein the flexible members are retained engaged with the hooked outer ends of said pivoted members.

In testimony whereof I affix my signature.

VANCE C. GARRISON.